(12) United States Patent
Thomas et al.

(10) Patent No.: US 10,365,481 B2
(45) Date of Patent: Jul. 30, 2019

(54) METHOD AND SYSTEM FOR AUTOMATICALLY CALIBRATING HMD DEVICE

(71) Applicant: Brillio LLC, Jersey City, NJ (US)

(72) Inventors: Renji Kuruvilla Thomas, Bangalore (IN); Gaurav Jain, Bangalore (IN); Karthik Gopalakrishnan Vinmani, Bangalore (IN); Puneet Gupta, Bangalore (IN)

(73) Assignee: BRILLIO LLC, Jersey City, NJ (US)

( * ) Notice: Subject to any disclaimer, the term of this patent is extended or adjusted under 35 U.S.C. 154(b) by 225 days.

(21) Appl. No.: 15/351,238

(22) Filed: Nov. 14, 2016

(65) Prior Publication Data
US 2018/0031829 A1 Feb. 1, 2018

(30) Foreign Application Priority Data
Jul. 27, 2016 (IN) .............................. 201641025775

(51) Int. Cl.
*G02B 27/00* (2006.01)
*G02B 27/01* (2006.01)
*G06F 3/147* (2006.01)

(52) U.S. Cl.
CPC ....... *G02B 27/0093* (2013.01); *G02B 27/017* (2013.01); *G06F 3/147* (2013.01); *G02B 2027/014* (2013.01); *G02B 2027/0187* (2013.01); *G09G 2320/0693* (2013.01); *G09G 2380/10* (2013.01)

(58) Field of Classification Search
CPC .............. G02B 27/0093; G02B 27/017; G02B 2027/0187; G02B 2027/014; G06F 3/147; G09G 2320/0693; G09G 2380/10
See application file for complete search history.

(56) References Cited

U.S. PATENT DOCUMENTS

| | | |
|---|---|---|
| 7,312,766 B1 | 12/2007 | Edwards |
| 7,542,210 B2 | 6/2009 | Chirieleison, Sr. |
| 9,202,385 B2 | 12/2015 | Pabst |
| 9,239,616 B1 | 1/2016 | Carrell |
| 9,268,136 B1 | 2/2016 | Starner et al. |
| 9,348,410 B2 | 5/2016 | LaValle et al. |
| 2008/0106489 A1 | 5/2008 | Brown |
| 2015/0056577 A1 | 2/2015 | Moran et al. |
| 2015/0097864 A1 | 4/2015 | Alaniz et al. |
| 2015/0294505 A1 | 10/2015 | Atsmon |

*Primary Examiner* — Aneeta Yodichkas

(57) ABSTRACT

The proposed invention provides a method for calibrating a HMD device of a user in a vehicle. The method includes detecting user movements while viewing VR content in the vehicle and checking if these motions meet user movement criteria. The method also includes detecting if the vehicle is stationary or moving. Further, on detecting that the vehicle is stationary dynamically calibrating the HMD device based on the movements of the user and on detecting that the vehicle is in motion dynamically calibrating the HMD device based on vehicle movements and the movements of the user.

29 Claims, 11 Drawing Sheets

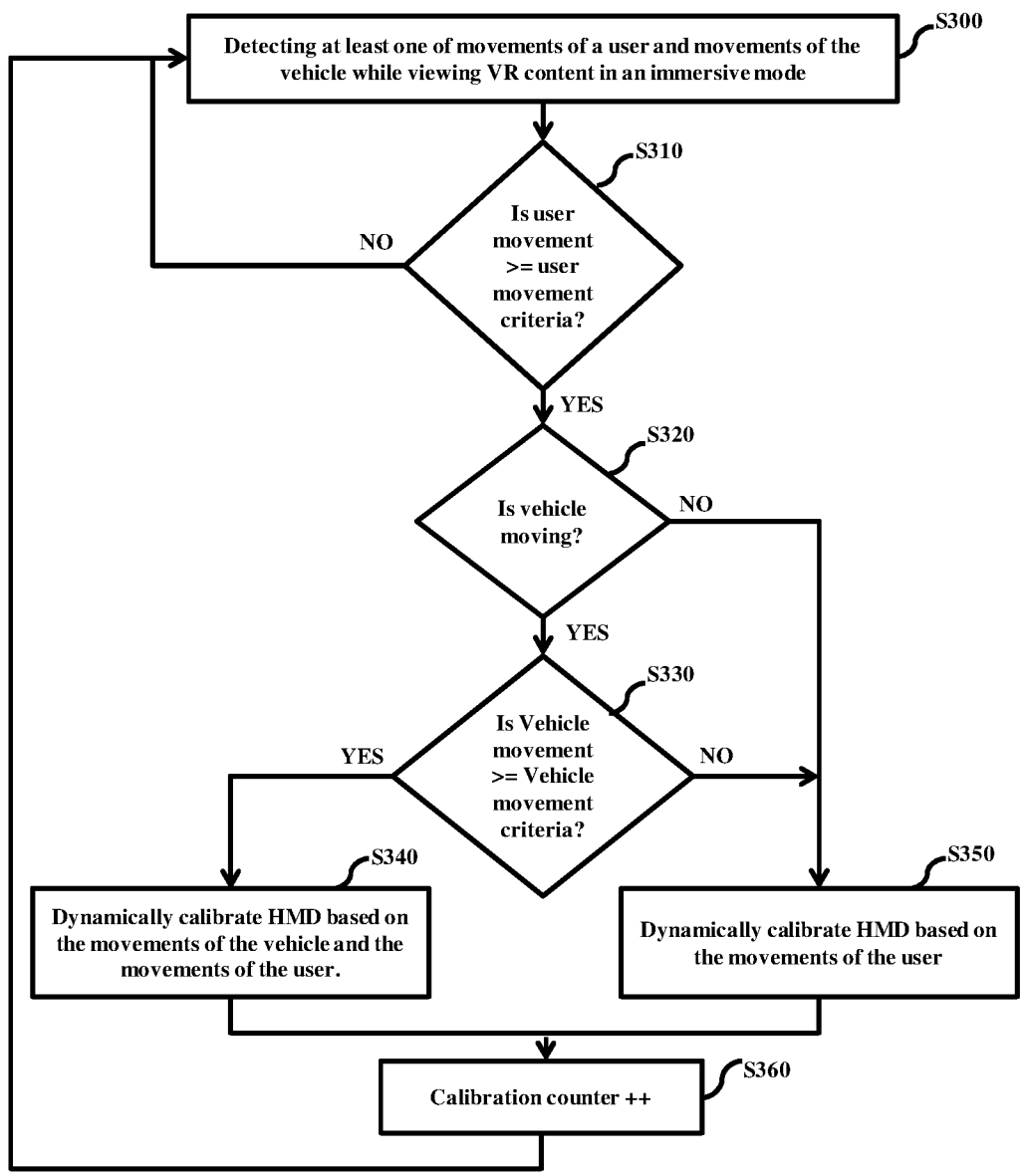

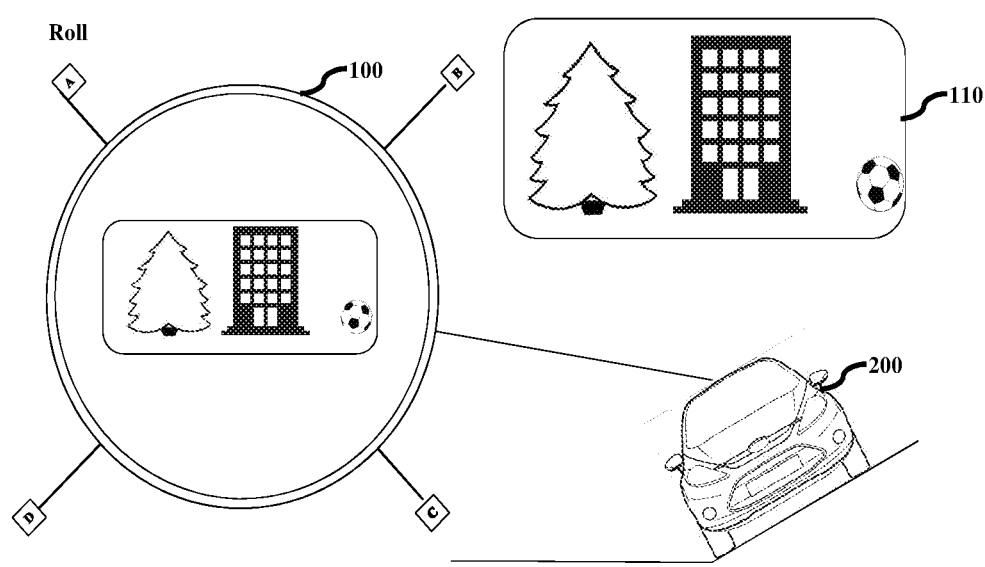

METHOD AND SYSTEM FOR AUTOMATICALLY CALIBRATING HMD DEVICE

TECHNICAL FIELD

The embodiments herein generally relate to Head Mounted Display (HMD) devices and more particularly to a method and system for automatically calibrating sensor parameters of the HMD device. The present application is based on, and claims priority from an Indian Application Number 201641025775 filed on 27 Jul. 2016, the disclosure of which is hereby incorporated by reference.

BACKGROUND

In general, HMD device outputs a content (e.g., video, media files, VR content, etc.) which has a 360 degree view. The user may view this content by moving their head in accordance with a locomotion of the content rendered thereof.

Consider a scenario: when a user is viewing the VR content, rendered by the HMD device, while travelling in a vehicle/when the vehicle is in motion, the various movements of the vehicle and the user may affect the field-of-view of the VR content, currently viewed by the user. In an example, if the user is viewing the portion of the VR content at an angle of 45 degrees and the vehicle makes a turn towards the right side due to which the position of the user (i.e., head movement, body position, etc.) relative to the vehicle also moves in the right side. This movement of the user and/or the vehicle causes the HMD device(s) to present the content (i.e., currently displayed) towards the right side which might not be intended by the user, therefore leading to an inadequate user experience.

Consider another scenario: when a user is viewing the VR content, rendered by the HMD device, when the vehicle is in not in motion, the various movements of the user may affect the field-of-view of the VR content, currently viewed by the user. In an example, if the user is viewing the VR content at some specific angle and then makes some movement like switching seats in the vehicle, the field-of-view of the VR changes due to the relative movement of the user.

SUMMARY

Accordingly the embodiments herein provide a method for calibrating a HMD device of a user in a vehicle. The method includes detecting at least one of movements of a user and movements of the vehicle while viewing content in an immersive mode, determining whether a calibration criteria is met, and performing one of dynamically calibrating the HMD device based on the at least one of the movements of the user and the movements of the vehicle in response to detecting that calibration criteria is met and dynamically calibrating the HMD device to switch to a non-immersive mode in response to detecting that the calibration criteria is not met.

In an embodiment, the calibration criteria comprises at least two of a rapidness of movements of the vehicle, a rapidness of movements of the user, a calibration counter, a calibration timer, a type of content being displayed on the HMD device, and user preference.

In an embodiment, dynamically calibrating the HMD device based on the at least one of the movements of the user and the movements of the vehicle in response to detecting that calibration criteria is met comprises: determining at least one of sensor data of the vehicle based on the movements of the vehicle, and sensor data of the HMD device based on the movements of the user, and dynamically calibrating the HMD device based on the at least one of the sensor data of the vehicle and the sensor data of the HMD device.

In an embodiment, the sensor data of the HMD device comprises information of yaw, pitch and roll of at least one sensor of the HMD device and the sensor data of the vehicle comprises information of yaw, pitch and roll of at least one sensor of the HMD device.

In an embodiment, a method provide a mechanism to automatically calibrate sensors of the HMD device with respect to calibration data of a moving vehicle.

In an embodiment, a method includes a mechanism: to adjust sensor data of the HMD device to a new base of reference for further tracking the VR content, calibrate the sensors of the HMD device to the calibration parameters of the moving vehicle to provide to compensate for changes in the field-of-view of the HMD device occurring due to the vehicle's motion, and determining whether a calibration counter used for determining a change in the calibration parameters of the moving vehicle is within a calibration criteria.

Accordingly the embodiments herein provide a method for calibrating a HMD device of a user in a vehicle. The method includes detecting movements of a user while viewing content in the vehicle, determining that the movements of the user meets a user movement criteria, detecting that the vehicle is one of stationary and moving, and performing one of dynamically calibrating the HMD device based on the movements of the user in response to detecting that the vehicle is stationary, and dynamically calibrating the HMD device based on movements of the vehicle and the movements of the user in response to detecting that the vehicle is moving.

In an embodiment, the HMD device is calibrated to seamlessly compensate for a change in position of content displayed in a field of view of the HMD device, wherein the change in the position of the content is formed by at least one of the movements of the user and the movements of the HMD device.

In an embodiment, dynamically calibrating the HMD device based on the movements of the user in response to detecting that the vehicle is stationary comprising: determining sensor data of the HMD device based on the movements of the user on detecting that the vehicle is stationary, detecting whether the calibration criteria is met, and performing one of calibrating the HMD device to the sensor data of the HMD device in response to determining that the calibration criteria is met and calibrating the HMD device to display the content in a non-immersive mode in response to determining that the calibration criteria is not met.

In an embodiment, the calibration criteria comprises at least two of a rapidness of movements of the user, a calibration counter, a calibration timer, a type of content being displayed on the HMD device, and user preference.

In an embodiment, the sensor data of the HMD device comprises information of yaw, pitch and roll of at least one sensor of the HMD device.

In an embodiment, the method for dynamically calibrating the HMD device based on the movements of the vehicle and the movements of the user in response to detecting that the vehicle is moving comprising: receiving sensor data of the vehicle based on the movements of the vehicle in response to detecting that the vehicle is moving, determining that the movements of the vehicle meets a vehicle movement criteria, determining sensor data of the HMD device based on the movements of the user, determining a correlation between the sensor data of the HMD device and the sensor data of the vehicle, determining whether a calibration criteria is met and performing one of calibrating the HMD device to the sensor data of the HMD device in response to determining that the calibration criteria is met, and calibrating the HMD device to display the content in a non-immersive mode in response to determining that the calibration criteria is not met.

In an embodiment, the calibration criteria comprises at least two of a rapidness of movements of the vehicle, a rapidness of movements of the user, a calibration counter, a calibration timer and a type of content being displayed on the HMD device.

In an embodiment, the sensor data of the HMD device comprises information of yaw, pitch and roll of at least one sensor of the HMD device and the sensor data of the vehicle comprises information of yaw, pitch and roll of at least one sensor of the HMD device.

Accordingly, the embodiments herein provide an apparatus for automatic calibration, the apparatus comprising a memory, a processor, coupled to the memory; and a calibration unit configured to detect at least one of movements of a user and movements of the vehicle while viewing content in an immersive mode; determine whether a calibration criteria is met, and perform one of dynamically calibrating the HMD device based on the at least one of the movements of the user and the movements of the vehicle in response to detecting that calibration criteria is met and dynamically calibrating the HMD device to switch to a non-immersive mode in response to detecting that calibration criteria is not met.

Accordingly, the embodiments herein provide a HMD device for automatically calibrating, comprising: a calibration log; a processor; and a calibration unit, in communication with the processor and the calibration log, configured to: detect movements of a user while viewing content in the vehicle, determine that the movements of the user meets a user movement criteria, detect that the vehicle is one of stationary and moving, and perform one of dynamically calibrate the HMD device based on the movements of the user in response to detecting that the vehicle is stationary, and dynamically calibrate the HMD device based on movements of the vehicle and the movements of the user in response to detecting that the vehicle is moving, and store calibrated values of the HMD device in the calibration log.

Accordingly, the embodiments herein provide a system for automatic calibration, the system comprising: a HMD device displaying an immersive view of content, the HMD device configured to: detect movements of a user while viewing the content in the vehicle, detect that the vehicle is one of stationary and moving, and perform one of dynamically calibrating the HMD device based on the movements of the user in response to detecting that the vehicle is stationary and dynamically calibrating the HMD device based on movements of the vehicle and the movements of the user in response to detecting that the vehicle is moving.

Accordingly, the embodiments herein provide a system for automatic calibration, the system comprising: a HMD device displaying an immersive view of the content. The HMD device configured to: detect at least one of movements of a user and movements of the vehicle while viewing content in an immersive mode, determine whether a calibration criteria is met, and perform one of dynamically calibrating the HMD device based on the at least one of the movements of the user and the movements of the vehicle in response to detecting that calibration criteria is met, and dynamically calibrating the HMD device to switch to an non-immersive mode in response detecting that calibration criteria is not met.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

The embodiments herein will be better understood from the following detailed description with reference to the drawings, in which:

FIG. 2A is a flow diagram illustrating a method for adjusting the calibration parameters of the HMD device while travelling in a vehicle, according to an embodiment as disclosed herein;

FIG. 6C illustrates an alternate representation of FIG. 6B, according to an embodiment as disclosed herein.

DETAILED DESCRIPTION OF EMBODIMENTS

Figure 1:
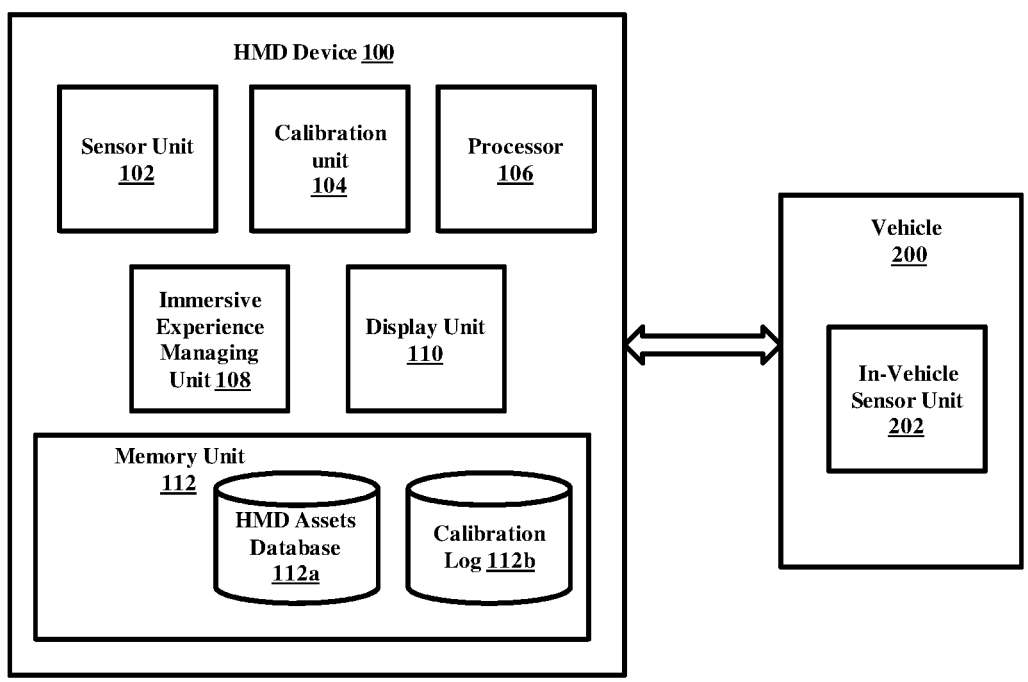
FIG. 1 illustrates a system for automatically calibrating a HMD device, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein disclose a method for calibrating a HMD device of a user in a vehicle. The method includes detecting at least one of movements of a user and movements of the vehicle while viewing content in an immersive mode and checking if the calibration criteria is met. Further, the method includes performing one of dynamically calibrating the HMD device based on the at least one of the movements of the user and the movements of the vehicle in response to detecting that calibration criteria is met, and dynamically calibrating the HMD device to switch to a non-immersive mode in response to detecting that the calibration criteria is not met.

Accordingly the embodiments herein provide a method for calibrating a HMD device of the user in the vehicle. The method includes detecting movements of the user while viewing the content in the vehicle, determining that the movements of the user meets a user movement criteria, detecting that the vehicle is one of stationary and moving, and performing one of dynamically calibrating the HMD device based on the movements of the user in response to detecting that the vehicle is stationary, and dynamically calibrating the HMD device based on movements of the vehicle and the movements of the user in response to detecting that the vehicle is moving.

Conventional mechanism focuses on orienting a presentation of the HMD device worn by the driver of the vehicle with respect to the relative movement of the driver. The relative movement of the driver includes, i.e., the movement of the driver while using the gear of the vehicle or applying the brakes etc. Unlike conventional mechanisms, the proposed HMD device takes into consideration the absolute movement of the user, where the absolute movement can be defined as the movement caused by the user independent of the vehicle.

Unlike conventional mechanism, the proposed mechanism calibrates the HMD device only when calibration criteria is met. The calibration criteria, thus, avoid frequent calibration of the HMD device to enhance the user experience, i.e., if the movements of the user are quick, aggressive, or very frequent, then the calibration of the HMD device is performed, else the data currently viewed by the user is not disturbed (i.e., when the calibration is not met). The calibration criteria thus avoids calibrating the HMD device when minor movements of the user are detected which may not affect the user experience.

Conventional mechanism generates a virtual view based on the vehicle data, the user data and a virtual world model by augmenting one or more components of the virtual world model based on at least one of the vehicle data and the user data. Unlike conventional mechanisms the proposed mechanism only calibrates the HMD device based on at least one of user movement data, vehicle movement and a correlation between the user movement data and vehicle movement data.

Unlike conventional mechanisms in which predetermined navigation information i.e., current route of the vehicle is recorded as part of vehicle data, the proposed mechanism considers only vehicle movement data i.e., yaw, pitch and roll axis data of the vehicle.

Unlike the conventional mechanism, the proposed mechanism is configured to identify the calibration parameters such as Yaw, Pitch and Roll using the in vehicle sensor and calibrate the sensor of the HMD device to update the display of the virtual view of the HMD device.

Referring now to the drawings, and more particularly to FIGS. 1 through 7, where similar reference characters denote corresponding features consistently throughout the figures, these are shown preferred embodiments.

FIG. 1 illustrates a system for automatically calibrating a HMD device 100 for viewing immersive content, according to an embodiment as disclosed herein.

Referring to the FIG. 1, the system includes the HMD device 100 and a vehicle 200. The HMD device 100 includes a sensor unit 102, a calibration unit 104, a processor 106 (for example; a hardware unit, an apparatus, a Central Processing Unit (CPU), a Graphics Processing Unit (GPU)), an immersive experience managing unit 108, a display unit 110 (e.g., a Cathode Ray Tube (CRT) display, a Liquid Crystal Display (LCD)), a Light-emitting diode (LED) being interfaced with the processor 106, a memory unit 112 (e.g., a volatile memory and/or a non-volatile memory) communicatively coupled to the processor 106; the memory unit 112 includes storage locations configured to be addressable through the processor 106. The memory unit 112 includes a HMD assets database 112*a* and a calibration log 112*b*.

The sensor unit 102 of the HMD device 100 can be, for example, an accelerometer sensor, a gyroscope sensor and a magnetometer sensor. The sensor unit 102 can be configured to detect various movements of the user. The various movements of the user may include, for example, user head movements, movements caused when the user shifts their position within the vehicle 200 and other absolute user movements. Further, the sensor unit 102 can be configured to fetch information of yaw, pitch and roll corresponding to the at least one sensor unit 102 which comprise the measured data.

The calibration unit 104 of the HMD device 100 is configured to detect at least one of movements of the user, and movements of the vehicle 200 while viewing content (i.e., VR content) in the immersive mode. Further, the calibration unit 104 can be configured to determine whether the calibration criteria is met. Furthermore, the calibration unit 104 can be configured to perform one of dynamically calibrating the HMD device 100 based on the at least one of the movements of the user and the movements of the vehicle 200 in response to detecting that calibration criteria is met and dynamically calibrating the HMD device 100 to switch to the non-immersive mode in response to detecting that calibration criteria is not met.

The calibration criteria may include, for example, a rapidness of movements of the user, a rapidness of movement of the vehicle 200, a calibration counter, a calibration timer, a type of content being displayed on the HMD device 100 and user preference. For example, unlike the conventional systems and methods, the calibration counter can be used to circumvent the false alarming and reducing unnecessary changes in the VR content being displayed to the user due to the false alarming. The calibration counter is adjusted only when movements of the vehicle exceeds the calibration criteria.

When the calibration unit 104 determines that the calibration criteria is met, then the calibration unit 104 can be configured to determine the at least one of sensor data (outputted by the sensor unit 202) of the vehicle 200 based on the movements of the vehicle, and sensor data (outputted by the sensor unit 102) of the HMD device 100 based on the movements of the user. The sensor data may include, for example, of yaw, pitch and roll of at least one sensor of the HMD device 100 and the sensor data of the vehicle 200 comprises information of yaw, pitch and roll of at least one sensor of the vehicle 200. Further, the calibration unit 104 can be configured to dynamically calibrate the HMD device 100 based on the at least one of the sensor data of the vehicle 200 and the sensor data of the HMD device 100.

In another embodiment, the calibration unit 104, in communication with the processor 106 and the calibration log 112*b*, is configured to detect the movements of the user while viewing the VR content in the vehicle 200 and to determine that the movements of the user meets a user movement criteria. The user movement criteria is dynamically determined based on the user movement data received from the sensor unit 102 of the HMD device 100.

Further, the calibration unit 104 detects whether the vehicle 200 is stationary or moving. If the calibration unit 104 detects that the vehicle 200 is stationary, then, the calibration unit 104 can dynamically calibrate the HMD device 100 based on the movements of the user therein. For example, the sensor unit 102 outputs only the absolute movements of the user (i.e., not in relative to the movement of the vehicle 200) to the calibration unit 104.

If the calibration unit 104 detects that the vehicle 200 is moving thereof the calibration unit 104 can dynamically calibrate the HMD device 100 based on movements of the vehicle 200 and the movements of the user therein. For example, the sensor unit 102 and a sensor unit 202 output the data (i.e., movements) of the user in relation with the data (i.e., movements) of the vehicle 200 to the calibration unit 104.

The calibration unit 104 stores a copy of the calibration values in the calibration log 112*b* of the memory unit 112.

The immersive experience managing unit 108, in communication with the display unit 110, is configured to monitor the content(s) (i.e., a video, an image, etc) rendered on the display unit 110 of the HMD device 100. The display unit 110 displays the immersive view or non-immersive view of the content on the HMD device 100, based on the output generated by the calibration unit 104, to the user.

The memory unit 112 may include one or more computer-readable storage media. The memory unit 112 comprises the HMD assets database 112*a* and the calibration log 112*b*. The calibration log 112*b* is configured to store calibration values computed by the calibration unit 104. Further, the memory unit 112 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 112 may, in some examples, be considered a non-transitory storage medium. The term "non-transitory" may indicate that the storage medium is not embodied in a carrier wave or a propagated signal. However, the term "non-transitory" should not be interpreted that the memory unit 112 is non-movable. In some examples, the memory unit 112 can be configured to store larger amounts of information than the memory. In certain examples, a non-transitory storage medium may store data that can, over time, change (e.g., in Random Access Memory (RAM) or cache). The processor 106 can be configured to interact with the units in the HMD device 100 to perform the functionalities of the corresponding units.

The vehicle 200 can be for example a car, a bus, a flight, a locomotive, or the like. The vehicle 200 comprises the in-vehicle sensor unit 202. The in-vehicle sensor unit 202 of the vehicle 200 can be, for example, an accelerometer, a gyroscope and a magnetometer. The in-vehicle sensor unit 202 (also referred as sensor unit 202) can be configured to detect the movement of the vehicle 200. The in-vehicle sensor unit 202 may be, for example, a sensor attached to the vehicle 200 body, a mobile sensor positioned on a car mount or a device that receives motion information of the vehicle 200. The in-vehicle sensor unit 202 receives the movements of the vehicle 200. The various movements of the vehicle 200 may include yaw, pitch, and roll corresponding to the vehicle 200.

For example, when the user experiences glitches due to the movement of the user and the movement of the vehicle 200. The sensor unit 102 may record (i.e., detect) and output the user movement data, caused due to the glitches, the calibration unit 104, and the in-vehicle sensor unit 202 may also record (i.e., detect) and output the vehicle 100 movement data, caused due to the glitches, to the calibration unit 104. Further, the calibration unit 104 determines whether the calibration criteria is met. Once the calibration unit 104 determines that the calibration criteria is met, the calibration unit 104 can dynamically calibrates the HMD device 100 based on the at least one of the movements of the user and the movements of the vehicle 200. If the calibration unit 104 determines that the calibration criteria is not met, then the calibration unit 104 dynamically calibrates the HMD device 100 to switch to non-immersive mode. Thus, the content currently viewed by the user may be switched from the immersive mode to the non-immersive mode.

In another embodiment, the user of the HMD device 100 is provided with an option to set calibration preferences, i.e., if the user wishes to view the current content in the immersive mode only irrespective of the calibration criteria, the processor 106 can be configured to receive the instructions from the user and may continue to render the content in the immersive mode. In yet another embodiment, the user of the HMD device 100, by way of the proposed method, can define the calibration criteria (i.e., user defined) based on the user preferences/type of the content.

The FIG. 1 shows the limited overview of the system but, it is to be understood that other embodiments are not limited thereto. Further, the system can include any number of hardware or software components communicating with each other. For example, the component can be, but not limited to, a process running in the sensor unit 102, the calibration unit 104, the processor 106, the sensor 202, and other units of the system.

FIG. 2A is a flow chart illustrating the method for adjusting the calibration parameters of the HMD device 100 while travelling in the vehicle 200, according to an embodiment as disclosed herein.

Referring to FIG. 2A, at S300, the HMD device 100 detects the at least one of the movements of the user and the movements of the vehicle 200 while viewing the VR content in the immersive mode in the vehicle 200. At S310 the HMD device 100 determines whether the user movements exceed the user movement criteria. If, at S310, the HMD device 100 determines that the user movements do not exceed the user movement criteria, then, the HMD device 100 performs step S300.

If at S310, the HMD device 100 determines that the user movements exceed (equal to) the user movement criteria, then, at S320, the HMD device 100 determines whether the vehicle 100 is in motion. If, at S320, the HMD device 100 determines that the vehicle 100 is in motion, then, at S330, the HMD device 100 may further determine whether the movement of the vehicle 100 is greater than or equal to the movement of the vehicle 100 criteria.

If at S330 the calibration unit 104 determines that the vehicle 100 movements meet the vehicle movement criteria, then at S340 the calibration unit 104 calibrates the HMD 100 based on the movements of the vehicle 200 and the movements of the user. If at S330 the calibration unit 104 determines that the vehicle 200 movement does not meet the vehicle 200 movement criteria, then at S350 the calibration unit 104 calibrates the HMD device 100 based on the movements of the user.

Yet again, at S320, if the calibration unit 104 determines that the vehicle 200 is stationary, then at S350 the calibration unit 104 calibrates the HMD device 100 based on the movements of the user.

At S360, the method includes incrementing the calibration counter after every calibration of the HMD device 100. In an embodiment, the calibration unit 104 increments the calibration counter after every calibration of the HMD device 100. Further, the sensor unit 102 continues tracking the movements of the user and movements of the vehicle 200.

Figure 2B:
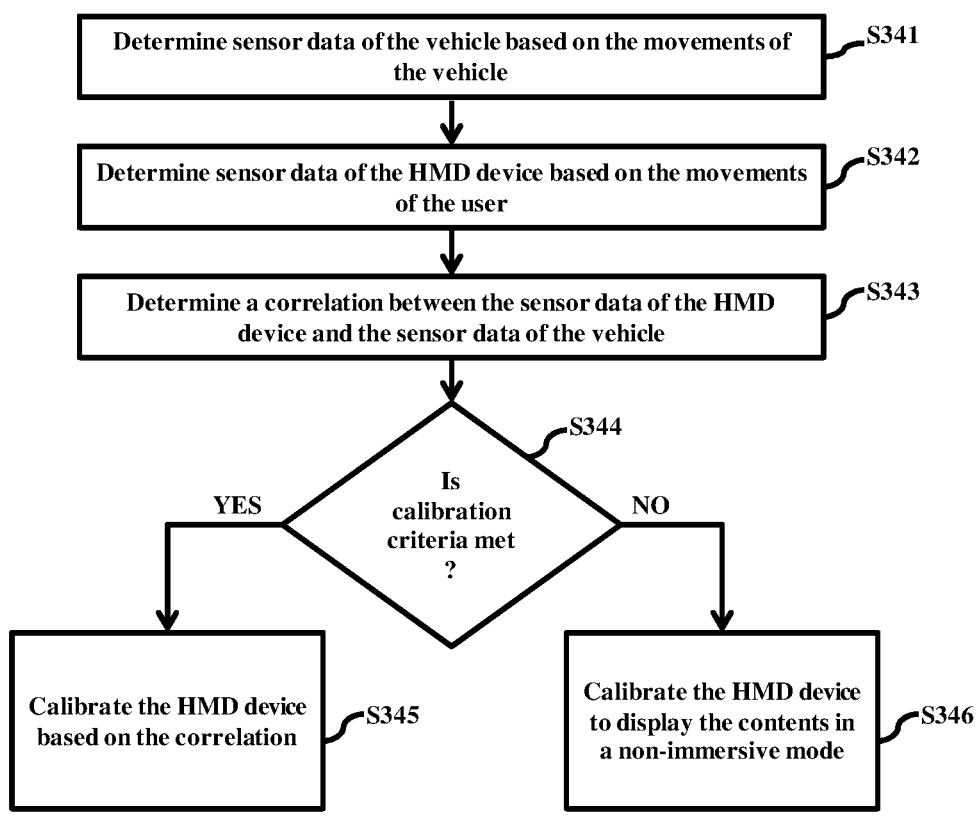
FIG. 2B is a flow diagram illustrating a method to dynamically calibrate the HMD device based on the movements of the vehicle and the movements of the user, according to an embodiment as disclosed herein.

FIG. 2B is a flow diagram illustrating a method to dynamically calibrate the HMD device 100 based on the movements of the vehicle 200 and the movements of the user, according to an embodiment as disclosed herein.

Referring to FIG. 2B, at S341 the method includes receiving the sensor data of the vehicle 200 based on the movements of the vehicle 200. In an embodiment, the method allows the in-vehicle sensor unit 202 to receive the sensor data of the vehicle 200 based on the movements of the vehicle 200. The sensor data of the vehicle 200 can include the information related to yaw, pitch and roll of at least one sensor of the vehicle 200. At S342 the method includes receiving the sensor data of the HMD device 100 based on the movements of the user. In an embodiment, the method allows the sensor unit 102 to receive the sensor data of the HMD device 100 based on the movements of the user. The sensor data of the HMD device 100 can include the information related to yaw, pitch and roll of at least one sensor of the HMD device 100. At S343, the method includes computing a correlation between the sensor data of the HMD device 100 and the sensor data of the vehicle 200. In an embodiment, the method allows the calibration unit 104 to compute a correlation between the sensor data of the HMD device 100 and the sensor data of the vehicle 200. For example, consider the yaw data of both the vehicle 200 and the HMD device 100. The correlation computed by the calibration unit 104 can be a difference between the yaw data of the vehicle 200 and the yaw data of the HMD device 100, mean value of the yaw data of the vehicle 200 and the yaw data of the HMD device 100, etc. The method includes storing the correlation data. The method allows the calibration unit 104 to store the correlation data in the calibration log 112b of the memory unit 112. At S344, the method includes determining whether the calibration criteria is met. In an embodiment, the method allows the calibration unit 104 to determine whether the calibration criteria is met. If, at S344, the calibration unit 104 determines that the calibration criteria is met, then at S345, the calibration unit 104 calibrates the HMD device 100 based on the correlation between the sensor data of the HMD device 100 and the sensor data of the vehicle 200. At S344, if the calibration unit 104 determines that the calibration criteria is not met, then, at S346, the calibration unit 104 calibrates the HMD device 100 to display the VR content in the non-immersive view.

Figure 2C:
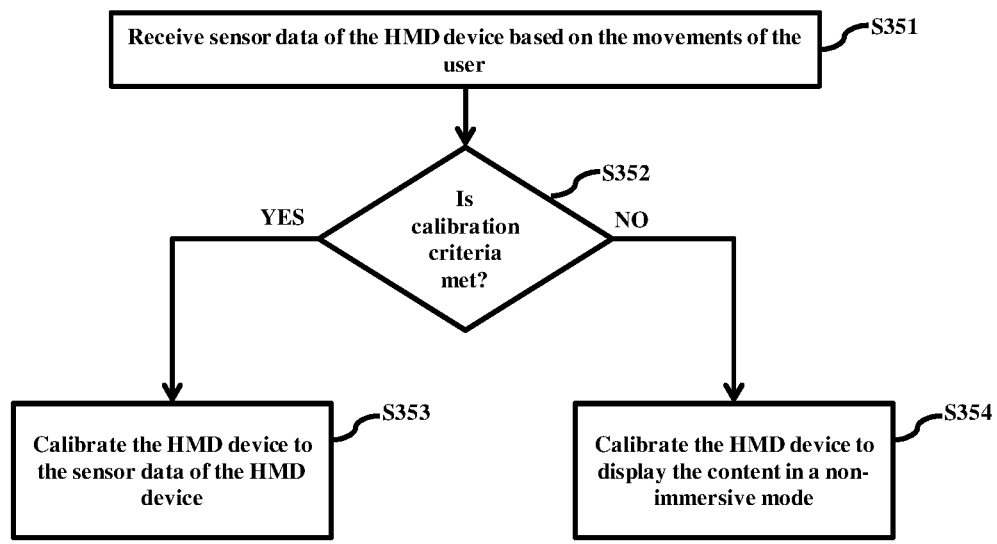
FIG. 2C is a flow diagram illustrating a method to dynamically calibrate the HMD device based on the movements of the user, according to an embodiment as disclosed herein.

FIG. 2C is a flow diagram illustrating a method to dynamically calibrate HMD device 100 based on the movements of the user, according to an embodiment as disclosed herein.

Referring to FIG. 2C, at S351 the method includes receiving the sensor data of the HMD device 100 based on the movements of the user. In an embodiment, the method allows the sensor unit 102 to receive the sensor data of the HMD device 100 based on the movements of the user. At S352, the method includes determining whether the calibration criteria is met. In an embodiment, the calibration unit 104 determines whether the calibration criteria is met. At S352, if the calibration unit 104 determines that the calibration criteria is met, then at S353 the calibration unit 104 calibrates the HMD device 100 to the sensor data of the HMD device 100. At S352, if the calibration unit 104 determines that the calibration criteria is not met, then at S354 the calibration unit 104 calibrates the HMD device 100 to display the VR contents in non-immersive mode.

Thus, the calibration criteria avoids calibrating the HMD device 100 when minor movements are detected which may not affect the user experience. The calibration criteria ensure that calibration is performed if the sensor data meets the calibration criteria.

The various actions, acts, blocks, steps, or the like in the flowchart may be performed in the order presented, in a different order or simultaneously. Further, in some embodiments, some of the actions, acts, blocks, steps, or the like may be omitted, added, modified, skipped, or the like without departing from the scope of the invention.

Figure 3:
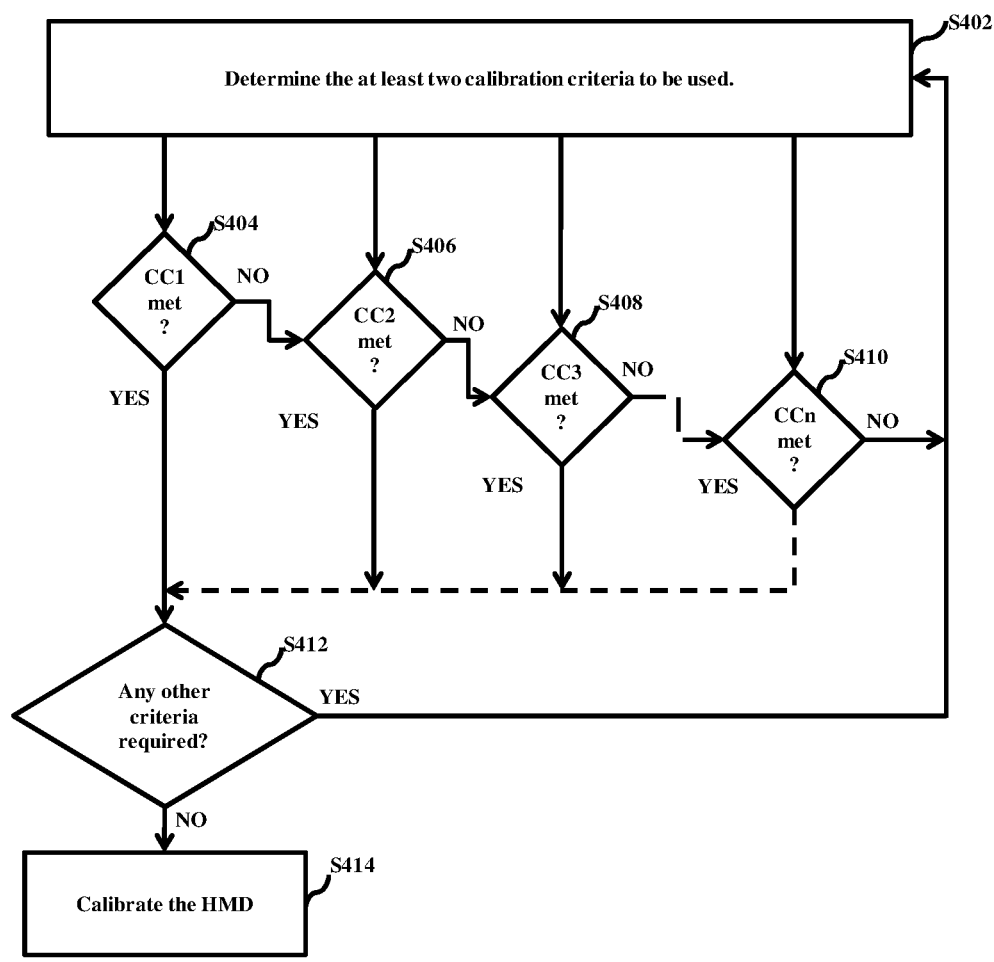
FIG. 3 illustrates a flow diagram illustrating a method to determine the calibration criteria to be used, according to an embodiment as disclosed herein.

FIG. 3 is a flow diagram illustrating the determination of the calibration criteria to be used, according to an embodiment as disclosed herein. At S402, the calibration unit 104 determines at least two parameters to be used as calibration criteria.

The calibration criteria(s) are included to avoid frequently calibrating the HMD device 100 based on user movements which can be quick, aggressive or at frequent intervals. The calibration criteria also avoid calibrating the HMD device 100 when minor movements are detected which may not affect the user experience. The calibration criteria ensure that calibration is performed if the sensor data meets the calibration criteria. If the sensor data does not meet the calibration criteria, the VR content is displayed in the non-immersive mode. The calibration criteria comprises at least two of a rapidness of movements of the user, a calibration counter, a calibration timer, a type of content being displayed on the HMD device 100, a threshold and the user preferences.

Referring to FIG. 3, the calibration unit 104 determines the various calibration criteria and determines the set of calibration criteria to be used to calibrate the HMD device 100, at S402. At S404, the calibration unit 104 determines if the calibration criteria-1 (CC1) is one of the calibration criteria to be used. On determining that the CC1 is one of the calibration criteria is to be used, the calibration unit 104, at S412 determines if any other calibration criteria along with the CC1 is to be considered. At S412, on determining that another calibration criteria is to be considered, then at S412, the calibration unit 104 loops back to S402. At S404, if the calibration unit 104 determines that CC1 does not meet the calibration criteria then at S406, the calibration unit 104 considers calibrating the HMD device 100 (i.e., sensor unit 102) with the calibration criteria CC2.

Similarly at S406, if the calibration unit 104 determines that CC2 does not meet the calibration criteria then at S408, the calibration unit 104 consider calibrating the HMD device 100 (i.e., sensor unit 102) with the calibration criteria CC3. If the calibration unit 104 determines that CC2 meets the calibration criteria then at S412, the calibration unit 104 determines if any other calibration criteria along with the CC3 is to be considered Similar operations are performed by the calibration unit 104, until, the calibration unit 104, at S412 on determines that there are no more calibration criteria to be included, the HMD device 100 is calibrated based on all the calibration criteria considered at S414.

In an example, the calibration criteria may include, for example, calibration counter (CC1), calibration timer (CC2), type of content to be used (CC3) and rapidness of movements of the vehicle 200 (CC4). Consider, only two calibration criteria i.e., CC1 and CC3 are used to calibrate the HMD device 100. At S404, the calibration unit 104 determines that CC1 is one of the calibration criteria to be considered. At S412, the calibration unit 104, on determining that more calibration criteria is to be considered, then the calibration unit 104 loops back to S402. Further, at S406, if the calibration unit 104 determines that CC2 is one of the calibration criteria to be considered, then the calibration unit 104 at S408 determines if CC3 is one of the calibration criteria to be considered. At S408, on determining that CC3 is one of the calibration criteria to be considered, the calibration unit 104 determines at S412 if any other calibration criteria is to be considered. At S412, the calibration unit 104 on determining that there are no more calibration criteria to be considered calibrates the HMD device 100 at S414.

In an example, consider that the user is viewing the VR content on the HMD device 100 while travelling in a vehicle 200. The calibration criteria considered are a combination of calibration counter (CC1) and calibration timer (CC2). Here the calibration counter (CC1) keeps track of the number of times the HMD device 100 is calibrated within certain duration of time, which is tracked by the calibration timer (CC2). Let the calibration counter value be set to 10 and the calibration timer set to ACTIVE state. Here as long as the calibration criteria is met i.e. as long as the number of calibrations performed is within 10 and the calibration timer is in ACTIVE state the HMD device 100 is calibrated based on the correlation determined between the sensor data of the HMD device 100 and the sensor data of the vehicle 200. When the number of calibrations done to the HMD device 100 exceeds 10, the VR content(s) are displayed in the non-immersive mode, as the calibration criteria is no longer met.

In yet another embodiment, for example, consider that the calibration criteria used is the type of content being displayed (CC1) and the calibration counter (CC2). Certain types of contents are best viewed in the immersive mode only with the depth effects. Hence based on the type of the content being displayed, the HMD device 100 is calibrated to display the contents in the immersive mode irrespective of the number of calibrations (i.e., calibration threshold). For example, consider the user currently viewing the content(s) pertaining to wild animals displayed on the display unit 110 and the calibration counter value (CC2) is set to be 10. If the user at any point of time while viewing of the content on the HMD device 100 is presented with the picture/video of the tiger therein and the calibration unit 114 thereat is initiated due to the movement of the vehicle 200. As, due to the continuous movement of the vehicle 200, the CC2 exceeds the threshold limit (i.e., 10), thus the HMD device 100, considering the type of content and the depth effect associated therewith, is configured to display the picture/video of the tiger in the immersive mode only irrespective of the CC2.

The various actions, acts, blocks, steps, or the like in the flow chart can be performed in the order presented, in a different order or simultaneously. Further, in some embodiments, some of the actions, acts, blocks, steps, or the like can be omitted, added, modified, skipped, or the like without departing from the scope of the invention.

FIG. 4 illustrates the VR content being displayed on the HMD device 100 of the user seated within the vehicle 200 with respect to the Yaw axis where 4A) is a normal view, 4B) is a distorted view without automatic calibration and 4C) is the view displayed to the user after automatic calibration, according to an embodiment as disclosed herein.

In an example, consider a scenario when the user is viewing the VR content rendered by the HMD device 100 while travelling in the vehicle 200. Due to the various movements of the user and the vehicle 200, the sensor unit 102 receives the sensor data of the HMD device 100 and the in-vehicle sensor unit 202 receives sensor data of the vehicle 200. The sensor data of the HMD device 100 comprises information of yaw, pitch and roll of at least one sensor of the HMD device 100 and the sensor data of the vehicle 200 comprises information of yaw, pitch and roll of at least one sensor of the vehicle 200.

Figure 4A:
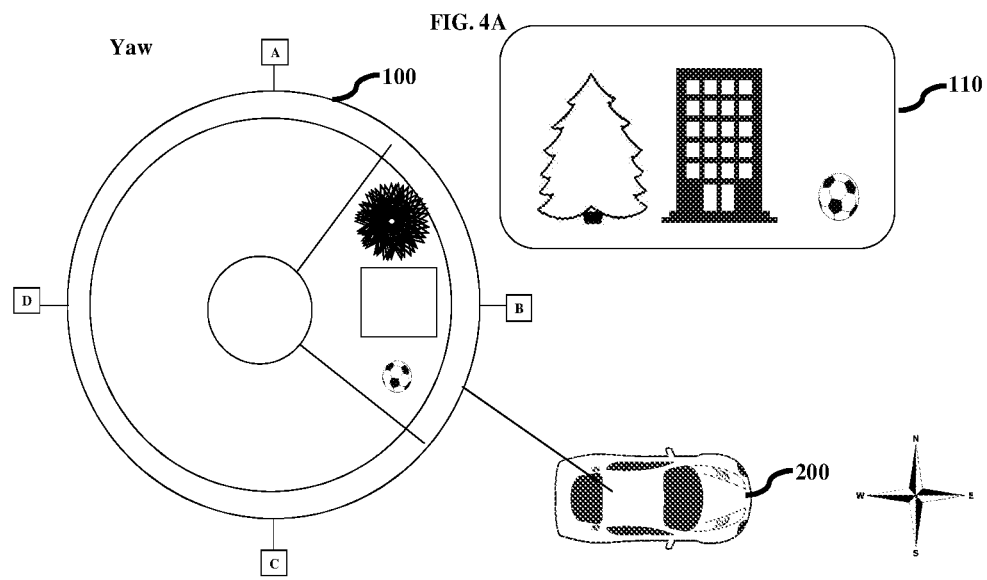
FIG. 4A illustrates the different views of the VR contents being displayed on the HMD device of a user seated within the vehicle with respect to the Yaw axis, according to an embodiment as disclosed herein.

FIG. 4A shows the normal immersive view of the VR content displayed on the display unit 110 of the HMD device 100, with respect to the yaw axis. The VR contents are displayed in the immersive view on the display unit 110 without any distortions within the field-of-view of the HMD device 100.

Figure 4B:
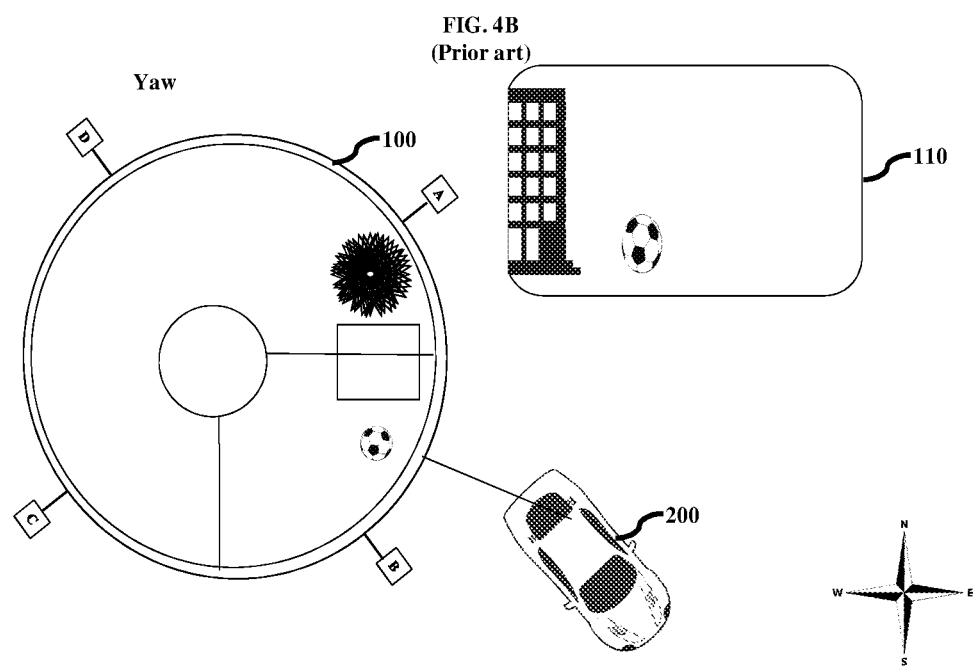
FIG. 4B illustrates the different views of the VR contents being displayed on the HMD device of a user seated within the vehicle with respect to the Yaw axis, according to prior art.

FIG. 4B illustrates the distorted view of the VR content displayed on the HMD device 100. When the vehicle 200 takes the right turn, the field-of-view of the VR content currently rendered on the HMD device 100 also moves towards the right, according to prior art.

Figure 4C:
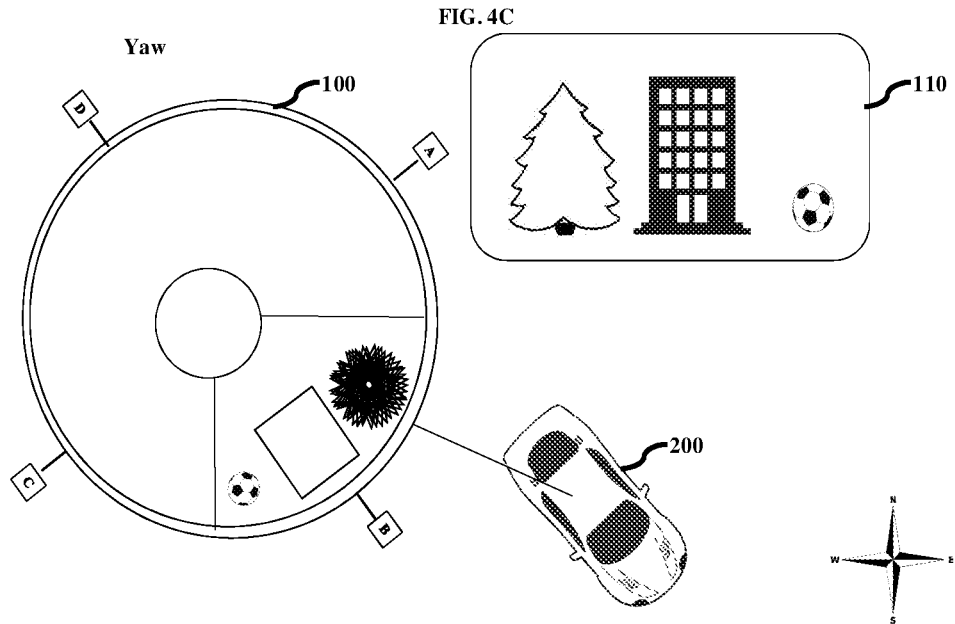
FIG. 4C illustrates an alternate representation of FIG. 4B, according to an embodiment as disclosed herein.

Unlike to the FIG. 4B, the proposed method automatically calibrates the HMD device 100 corresponding to the movements of the user and the vehicle 200. Thus, when the vehicle 200 takes a right turn the HMD device 100 automatically calibrates to display the VR contents accordingly (i.e. to the right) to the movement of the user and the movement of the vehicle 200 with respect to the yaw axis as shown in FIG. 4C.

FIG. 5 illustrates the VR content being displayed on the HMD device 100 of the user seated within the vehicle 200 with respect to the Pitch axis where 5A) is the normal view, 5B) is the distorted view without automatic calibration and 5C) is the view displayed to the user after automatic calibration, according to an embodiment as disclosed herein.

In an example, consider a scenario when the user is viewing the VR content rendered by the HMD device 100 while travelling in the vehicle 200. Due to the various movements of the user and the vehicle 200, the sensor unit 102 receives the sensor data of the HMD device 100 and the in-vehicle sensor unit 202 receives sensor data of the vehicle 200. The sensor data of the HMD device 100 comprises information of yaw, pitch and roll of at least one sensor of the HMD device 100 and the sensor data of the vehicle 200 comprises information of yaw, pitch and roll of at least one sensor of the vehicle 200.

Figure 5A:
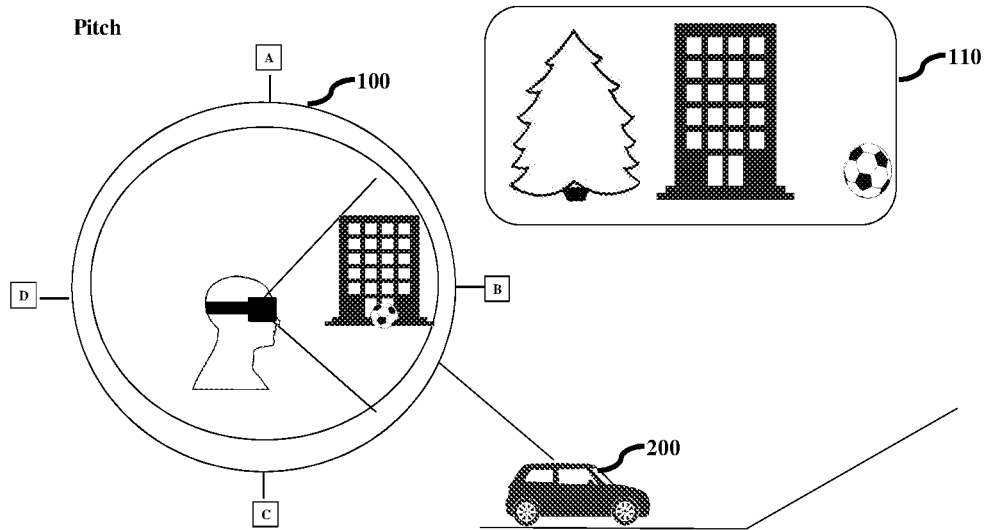
FIG. 5A illustrates the different views of the VR contents being displayed on the HMD device of a user seated within the vehicle with respect to the Pitch axis, according to an embodiment as disclosed herein.

FIG. 5A shows the normal immersive view of the VR content displayed on the display unit 110 of the HMD device 100, with respect to the pitch axis. The VR contents are displayed in the immersive view on the display unit 110 without any distortions within the field-of-view of the HMD device 100.

Figure 5B:
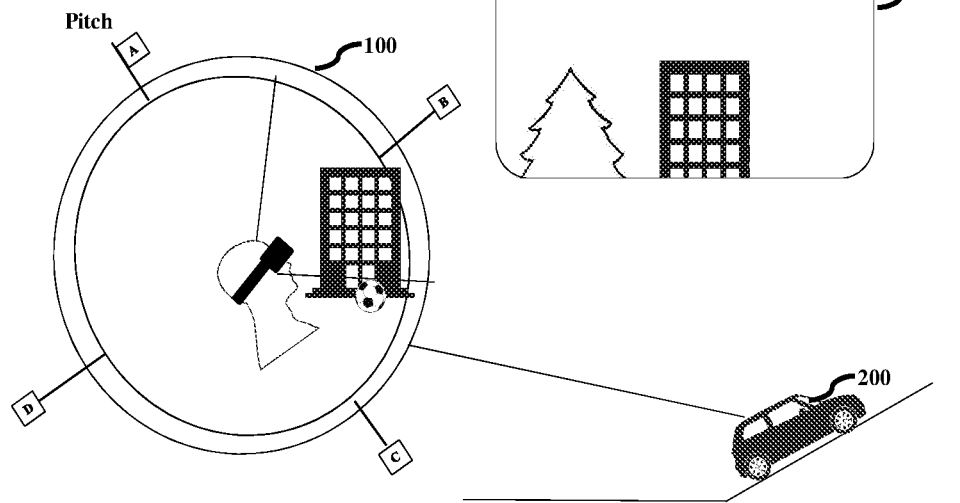
FIG. 5B illustrates the different views of the VR contents being displayed on the HMD device of a user seated within the vehicle with respect to the Pitch axis, according to prior art.

FIG. 5B illustrates the distorted view of the VR content displayed on the HMD device 100. When the vehicle 200 moves uphill or downhill, the field-of-view of the VR content currently rendered on the HMD device 100 displays either the top portion of the VR content distorting the bottom portion or displays the bottom portion of the VR content distorting the top portion respectively, according to prior art.

Figure 5C:
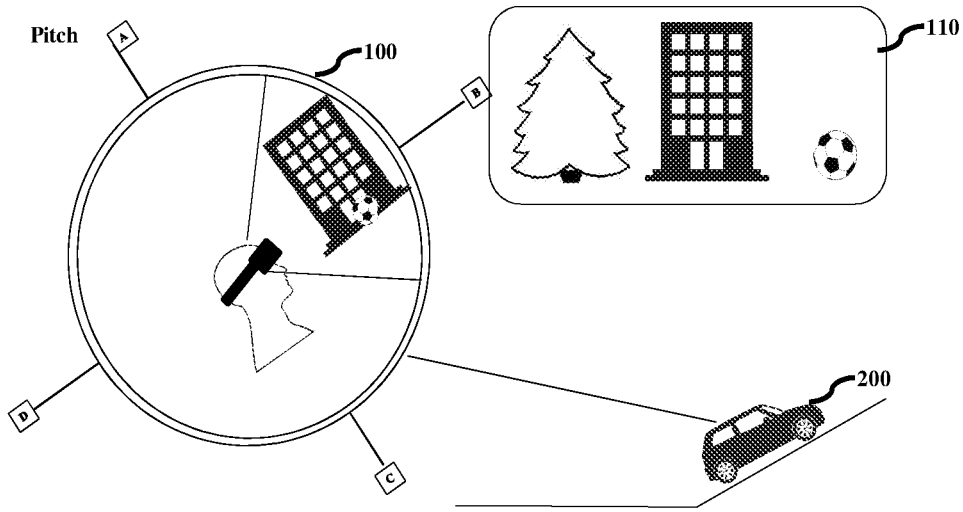
FIG. 5C illustrates an alternate representation of FIG. 5B, according to an embodiment as disclosed herein.

Unlike to the FIG. 5A, the proposed method automatically calibrates the HMD device 100 corresponding to the movements of the user and the vehicle 200. Thus, when the vehicle 200 moves uphill or downhill the HMD device 100 automatically calibrates to display the VR contents according to the movement of the user and the movement of the vehicle 200 with respect to the pitch axis as shown in FIG. 5C.

FIG. 6 illustrates the VR content being displayed on the HMD device 100 of the user seated within the vehicle 200 with respect to the Roll axis where 6A) is the normal immersive view, 6B) is the distorted view without automatic calibration, and 6C) is the view displayed to the user after automatic calibration, according to an embodiment as disclosed herein.

In an example, consider a scenario when the user is viewing the VR content rendered by the HMD device 100 while travelling in the vehicle 200. Due to the various movements of the user and the vehicle 200, the sensor unit 102 receives the sensor data of the HMD device 100 and the in-vehicle sensor unit 202 receives sensor data of the vehicle 200. The sensor data of the HMD device 100 comprises information of yaw, pitch and roll of at least one sensor of the HMD device 100 and the sensor data of the vehicle 200 comprises information of yaw, pitch and roll of at least one sensor of the vehicle 200.

Figure 6A:
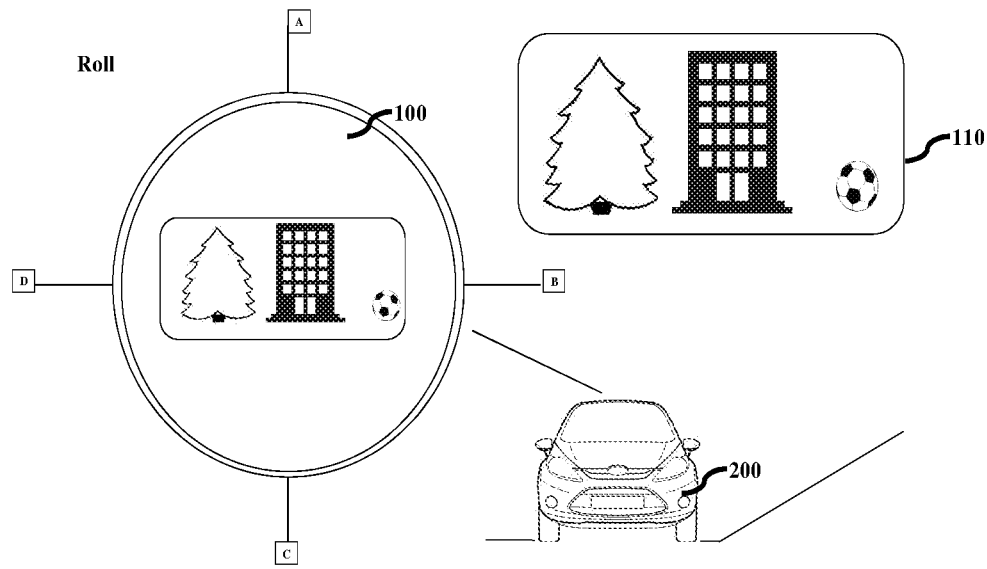
FIG. 6A illustrates the different views of the VR contents being displayed on the HMD device of a user seated within the vehicle with respect to the Roll axis, according to an embodiment as disclosed herein.

FIG. 6A shows the normal immersive view of the VR content displayed on the display unit 110 of the HMD device 100, with respect to the roll axis. The VR contents are displayed in the immersive view on the display unit 110 without any distortions within the field-of-view of the HMD device 100.

Figure 6B:
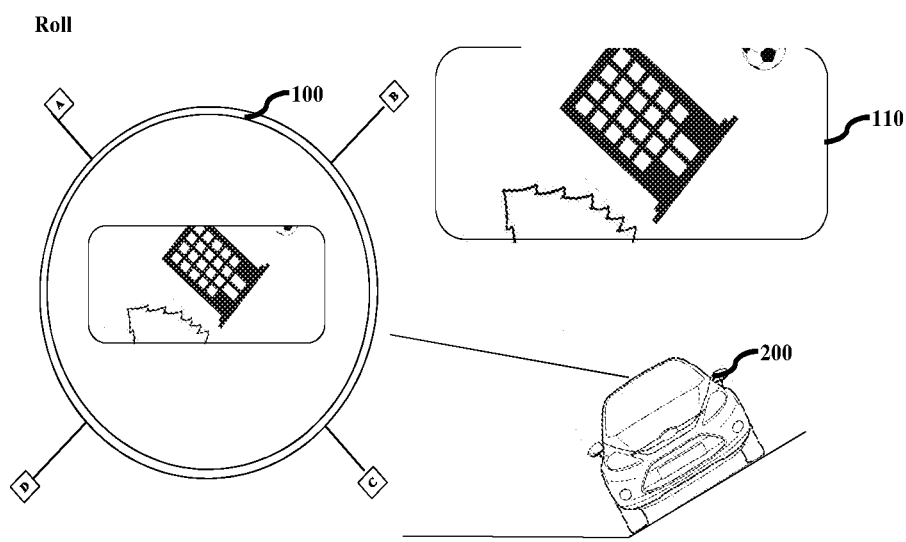
FIG. 6B illustrates the different views of the VR contents being displayed on the HMD device of a user seated within the vehicle with respect to the Roll axis, according to prior art.

FIG. 6B illustrates the distorted view of the VR content displayed on the HMD device 100. When the vehicle 200 moves over the hump or uneven surface, the field-of-view of the VR content currently rendered on the HMD device 100 is distorted, according to prior art.

Unlike to the FIG. 6, the proposed method automatically calibrates the HMD device 100 corresponding to the movements of the user and the vehicle 200. Thus, when the vehicle 200 moves over the hump or uneven surface the HMD device 100 automatically calibrates to display the VR contents according to the movement of the user and the movement of the vehicle 200 with respect to the roll axis as shown in FIG. 6C.

Figure 7:
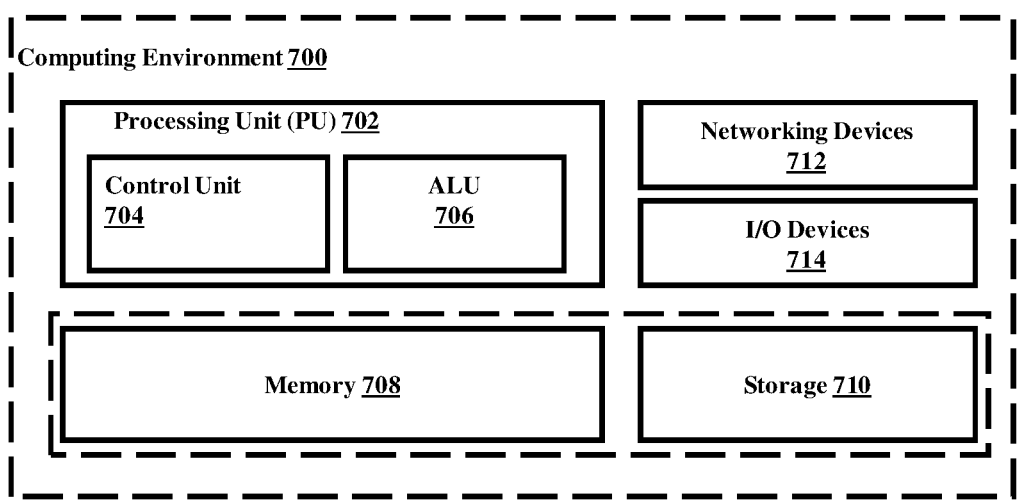
FIG. 7 illustrates a computing environment implementing a method and system for adjusting calibration parameters of the HMD device, to provide undistorted VR content on the HMD device of the user viewing the contents in the vehicle, according to an embodiment as disclosed herein.

FIG. 7 illustrates a computing environment implementing a method and system for adjusting calibration parameters of the HMD device 100, to provide undistorted VR content on the HMD device 100 of the user viewing the contents in the vehicle 200, according to an embodiment as disclosed herein.

FIG. 7 illustrates a computing environment 700 implementing the method and system for automatically calibrating HMD device 100 for viewing VR content on the HMD device 100. As depicted in the FIG. 7, the computing environment 700 comprises at least one processing unit 702 that is equipped with a control unit 704 and an Arithmetic Logic Unit (ALU) 706, a memory 708, a storage unit 710, plurality of networking device 712, and a plurality Input output (I/O) devices 714. The processing unit 702 is responsible for processing the instructions of the schemes. The processing unit 702 receives commands from the control unit 704 in order to perform its processing. Further, any logical and arithmetic operations involved in the execution of the instructions are computed with the help of the ALU 706.

The overall computing environment 700 can be composed of multiple homogeneous or heterogeneous cores, multiple CPUs of different kinds, special media and other accelerators. The processing unit 702 is responsible for processing the instructions of the schemes. Further, the plurality of processing units 702 may be located on a single chip or over multiple chips.

The scheme comprising of instructions and codes required for the implementation are stored in either the memory unit 708 or the storage 710 or both. At the time of execution, the instructions may be fetched from the corresponding memory 708 or storage unit 710, and executed by the processing unit 702.

In case of any hardware implementations various networking devices 712 or external I/O devices 714 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 7 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for calibrating a Head Mounted Display (HMD) device of a user in a vehicle, the method comprising:
   detecting at least one of movements of a user and movements of the vehicle while viewing content in an immersive mode;
   determining whether a first calibration criteria is met and at least one second calibration criteria is met, wherein the first calibration criteria is different than the at least one second calibration criteria; and
   performing one of:
      determining at least one of a direction of the vehicle based on the movements of the vehicle and a position of the user based on the movements of the HMD device and dynamically calibrating the HMD device by adjusting the content based on the at least one of the position of the user and the direction of the vehicle, in response to detecting that both the first calibration criteria and the at least one second calibration criteria are met, and
      dynamically calibrating the HMD device by displaying the content in a non-immersive mode in response to detecting one of both the first calibration criteria and the at least one second calibration criteria are not met, and the first calibration criteria is met but the at least one second calibration criteria is not met.

2. The method of claim 1, wherein the first calibration criteria comprises at least one of a calibration counter, a calibration timer, and the at least one second calibration criteria comprises at least one of a rapidness of movements of the vehicle, a rapidness of the movements of the user, a type of content being displayed on the HMD device, and user preferences.

3. The method of claim 1, wherein determining at least one of the direction of the vehicle based on the movements of the vehicle and the position of the user based on the movements of the HMD device comprising:
   determining at least one of sensor data of the vehicle based on the movements of the vehicle, and sensor data of the HMD device based on the movements of the user; and
   determining at least one of the direction of the vehicle based on the sensor data of the vehicle and the position of the user based on the sensor data of the HMD device.

4. The method of claim 3, wherein the sensor data of the HMD device comprises information of yaw, pitch and roll of at least one sensor of the HMD device and the sensor data of the vehicle comprises information of yaw, pitch and roll of at least one sensor of the vehicle.

5. A method for calibrating a Head Mounted Display (HMD) device of a user in a vehicle, the method comprising:
   detecting movements of a user while viewing content in the vehicle;
   determining that the movements of the user meets a user movement criteria;
   detecting that the vehicle is one of stationary and moving; and
   performing one of:
      determining a position of the user based on the movement of the user and dynamically calibrating the HMD device by adjusting the content based on the position of the user, in response to detecting that the vehicle is stationary, and
      determining movements of the vehicle, determining a direction of the vehicle based on the movements of the vehicle and a position of the user based on the movements of the user and dynamically calibrating the HMD device by adjusting the content based on the direction of the vehicle and the position of the user, in response to detecting that the vehicle is moving.

6. The method of claim 5, wherein the HMD device is calibrated to seamlessly compensate for a change in position of content displayed in a field of view of the HMD device, wherein the change in the position of the content is formed by at least one of the movements of the user and the movements of the HMD device.

7. The method of claim 5, wherein calibrating the HMD device by adjusting the content based on the position of the user, in response to detecting that the vehicle is stationary comprising:
   determining sensor data of the HMD device based on the movements of the user in response to detecting that the vehicle is stationary;
   detecting whether a plurality of calibration criteria are met; and
   performing one of:
      calibrating the HMD device to position of the user, in response to determining that the plurality of calibration criteria are met, and
      calibrating the HMD device to display the content in a non-immersive mode in response to determining that the plurality of calibration criteria are not met.

8. The method of claim 7, wherein the plurality of calibration criteria comprises at least two of a rapidness of movements of the user, a calibration counter, a calibration timer, a type of content being displayed on the HMD device, and user preference.

9. The method of claim 7, wherein the sensor data of the HMD device comprises information of yaw, pitch and roll of at least one sensor of the HMD device.

10. The method of claim 5, wherein dynamically calibrating the HMD device by adjusting the content based on the direction of the vehicle and the position of the user in response to detecting that the vehicle is moving comprising:
receiving sensor data of the vehicle based on the movements of the vehicle in response to detecting that the vehicle is moving;
determining that the movements of the vehicle meets a vehicle movement criteria;
determining sensor data of the HMD device based on the movements of the user;
determining a correlation between the sensor data of the HMD device and the sensor data of the vehicle based on the direction of the vehicle and the position of the user;
determining whether a plurality of calibration criteria are met; and
performing one of:
calibrating the HMD device based on the correlation in response to determining that the plurality of calibration criteria are met, and
calibrating the HMD device to display the content in a non-immersive mode in response to determining that the plurality of calibration criteria are not met.

11. The method of claim 10, wherein the plurality of calibration criteria comprises at least two of a rapidness of movements of the vehicle, a rapidness of movements of the user, a calibration counter, a calibration timer and a type of content being displayed on the HMD device and user preference.

12. The method of claim 10, wherein the sensor data of the HMD device comprises information of yaw, pitch and roll of at least one sensor of the HMD device and the sensor data of the vehicle comprises information of yaw, pitch and roll of at least one sensor of the vehicle.

13. An apparatus for automatic calibration, comprising
a memory;
a processor, coupled to the memory; and
a calibration unit, configured to
detect at least one of movements of a user and movements of the vehicle while viewing content in an immersive mode;
determine whether a first calibration criteria is met and at least one second calibration criteria is met, wherein the first calibration criteria is different than the at least one second calibration criteria; and
performing one of:
determine at least one of a direction of the vehicle based on the movements of the vehicle and a position of the user based on the movements of the HMD device and dynamically calibrate the HMD device by adjusting the content based on the at least one of the position of the user and the direction of the vehicle, in response to detecting that both the first calibration criteria and the at least one second calibration criteria are met, and
dynamically calibrate the HMD device by displaying the content in a non-immersive mode in response to detecting one of both the first calibration criteria and the at least one second calibration criteria are not met, and the first calibration criteria is met but the at least one second calibration criteria is not met.

14. The apparatus of claim 13, wherein the first calibration criteria comprises at least one of a calibration counter, a calibration timer, and the at least one second calibration criteria comprises at least one of a rapidness of movements of the vehicle, a rapidness of the movements of the user, a type of content being displayed on the HMD device, and user preferences.

15. The apparatus of claim 13, wherein determine at least one of the direction of the vehicle based on the movements of the vehicle and the position of the user based on the movements of the HMD device comprising:
determine at least one of sensor data of the vehicle based on the movements of the vehicle, and sensor data of the HMD device based on the movements of the user; and
determine at least one of the direction of the vehicle based on the sensor data of the vehicle and the position of the user based on the sensor data of the HMD device.

16. The apparatus of claim 15, wherein the sensor data of the HMD device comprises information of yaw, pitch and roll of at least one sensor of the HMD device and the sensor data of the vehicle comprises information of yaw, pitch and roll of at least one sensor of the vehicle.

17. A Head Mounted Display (HMD) device for automatic calibration, comprising:
a calibration log;
a processor; and
a calibration unit, in communication with the processor and the calibration log, configured to:
detect movements of a user while viewing content in the vehicle,
determine that the movements of the user meets a user movement criteria,
detect that the vehicle is one of stationary and moving, perform one of:
determine a position of the user based on the movement of the user and dynamically calibrate the HMD device by adjusting the content based on the position of the user, in response to detecting that the vehicle is stationary, and
determine movements of the vehicle, determining a direction of the vehicle based on the movements of the vehicle and a position of the user based on the movements of the user and dynamically calibrate the HMD device by adjusting the content based on the direction of the vehicle and the position of the user, in response to detecting that the vehicle is moving.

18. The HMD device of claim 17, wherein the HMD device is calibrated to seamlessly compensate for a change in position of content displayed in a field of view of the HMD device, wherein the change in the position of the content is caused by at least one of the movements of the user and the movements of the HMD device.

19. The HMD device of claim 17, wherein calibrating the HMD device by adjusting the content based on the position of the user, in response to detecting that the vehicle is stationary comprising:
determining sensor data of the HMD device based on the movements of the user in response to detecting that the vehicle is stationary;
detecting whether a plurality of calibration criteria are met; and
performing one of:
calibrating the HMD device to position of the user, in response to determining that the calibration criteria is met, and
calibrating the HMD device to display the content in a non-immersive mode in response to determining that the calibration criteria is not met.

20. The HMD device of claim 19, wherein the calibration criteria comprises at least two of a rapidness of movements of the user, a calibration counter, a calibration timer, a type of content being displayed on the HMD device, and a user preference.

21. The HMD device of claim 19, wherein the sensor data of the HMD device comprises information of a yaw, a pitch and a roll of at least one sensor of the HMD device.

22. The HMD device of claim 17, wherein the calibration unit configured to dynamically calibrate the HMD device by adjusting the content based on the direction of the vehicle and the position of the user in response to detecting that the vehicle is moving comprising:
- receiving sensor data of the vehicle based on the movements of the vehicle in response to detecting that the vehicle is moving;
- determining that the movements of the vehicle meets a vehicle movement criteria;
- determining sensor data of the HMD device based on the movements of the user;
- determining a correlation between the sensor data of the HMD device and the sensor data of the vehicle based on the direction of the vehicle and the position of the user;
- determining whether a calibration criteria is met; and
- performing one of:
  - calibrating the HMD device based on the correlation in response to determining that the calibration criteria is met, and
  - calibrating the HMD device to display the content in a non-immersive mode in response to determining that the calibration criteria is not met.

23. The HMD device of claim 22, wherein the calibration criteria comprises a at least two of a rapidness of movements of the vehicle, a rapidness of movements of the user, a calibration counter, a calibration timer, a type of content being displayed on the HMD device and user preference.

24. The HMD device of claim 22, wherein the sensor data of the HMD device comprises information of yaw, pitch and roll of at least one sensor of the HMD device and the sensor data of the vehicle comprises information of yaw, pitch and roll of at least one sensor of the vehicle.

25. A system for automatic calibration, comprising:
- a vehicle comprising an in-vehicle sensor unit configured to sense movements of the vehicle; and
- a HMD device displaying an immersive view of content, the HMD device is configured to:
- detect movements of a user while viewing the content in the vehicle;
- determine that the movements of the user meets a user movement criteria;
- detect that the vehicle is one of stationary and moving; and
- performing one of:
  - determine a position of the user based on the movement of the user and dynamically calibrating the HMD device by adjusting the content based on the position of the user, in response to detecting that the vehicle is stationary, and
  - determine movements of the vehicle, determine a direction of the vehicle based on the movements of the vehicle and a position of the user based on the movements of the user, and dynamically calibrate the HMD device by adjusting the content based on the direction of the vehicle and the position of the user, in response to detecting that the vehicle is moving.

26. The system of claim 25, wherein adjusting the content based on the position of the user, in response to detecting that the vehicle is stationary comprising:
- determine sensor data of the HMD device based on the movements of the user in response to detecting that the vehicle is stationary;
- detect whether a plurality of calibration criteria are met, wherein a first calibration criteria from plurality of calibration criteria comprises at least one of a calibration counter, a calibration timer, and at least one second calibration criteria plurality of calibration criteria comprises at least one of a rapidness of movements of the vehicle, a rapidness of the movements of the user, a type of content being displayed on the HMD device, and user preferences; and
- perform one of:
  - calibrate the HMD device to position of the user, in response to determining that the plurality of calibration criteria are met, and
  - calibrate the HMD device to display the content in a non-immersive mode in response to determining that the plurality of calibration criteria are not met.

27. The system of claim 25, wherein the HMD device is configured to dynamically calibrate the HMD device by adjusting the content based on the direction of the vehicle and the position of the user in response to detecting that the vehicle is moving comprising:
- receive sensor data of the vehicle based on the movements of the vehicle in response to detecting that the vehicle is moving;
- determine that the movements of the vehicle meets a vehicle movement criteria;
- determine sensor data of the HMD device based on the movements of the user;
- determine a correlation between the sensor data of the HMD device and the sensor data of the vehicle based on the direction of the vehicle and the position of the user;
- determine whether a plurality of calibration criteria are met, wherein a first calibration criteria from plurality of calibration criteria comprises at least one of a calibration counter, a calibration timer, and at least one second calibration criteria plurality of calibration criteria comprises at least one of a rapidness of movements of the vehicle, a rapidness of the movements of the user, a type of content being displayed on the HMD device, and user preferences; and
- perform one of:
  - calibrate the HMD device based on the correlation in response to determining that the plurality of calibration criteria are met, and
  - calibrate the HMD device to display the content in a non-immersive mode in response to determining that the plurality of calibration criteria are not met.

28. A system for automatic calibration, comprising:
- a vehicle comprising an in-vehicle sensor unit configured to sense movements of the vehicle; and
- a HMD device displaying an immersive view of content, the HMD device configured to:
- detect at least one of movements of a user and movements of the vehicle while viewing the content in an immersive mode;
- determine whether a whether a first calibration criteria is met and at least one second calibration criteria is met, wherein the first calibration criteria is different than the at least one second calibration criteria, wherein the first calibration criteria comprises at least one of a calibration counter, a calibration timer, and wherein the at least one second calibration criteria comprises at least one of a rapidness of movements of the vehicle, a rapidness of the movements of the user, a type of content being displayed on the HMD device, and user preferences, and wherein; and performing one of:
    determine at least one of a direction of the vehicle based on the movements of the vehicle and a position of the user based on the movements of the HMD device and dynamically calibrate the HMD device by adjusting the content based on the at least one of the position of the user and the direction of the vehicle, in response to detecting that both the first calibration criteria and the at least one second calibration criteria are met, and
    dynamically calibrate the HMD device by displaying the content in a non-immersive mode in response to detecting one of both the first calibration criteria and the at least one second calibration criteria are not met, and the first calibration criteria is met but the at least one second calibration criteria is not met.

29. The system of claim 28, wherein determine at least one of the direction of the vehicle based on the movements of the vehicle and the position of the user based on the movements of the HMD device comprises:
    determine at least one of sensor data of the vehicle based on the movements of the vehicle, and sensor data of the HMD device based on the movements of the user wherein the sensor data of the HMD device comprises information of yaw, pitch and roll of at least one sensor of the HMD device and the sensor data of the vehicle comprises information of yaw, pitch and roll of at least one sensor of the vehicle; and
    determine at least one of the direction of the vehicle based on the sensor data of the vehicle and the position of the user based on the sensor data of the HMD device.

* * * * *